United States Patent [19]

Tyler

[11] 4,318,815
[45] Mar. 9, 1982

[54] SULFATED BIOPOLYMERS FOR USE IN RECOVERING PETROLEUM FROM A SUBTERRANEAN FORMATION

[75] Inventor: Timothy N. Tyler, Houston, Tex.
[73] Assignee: Texaco Inc., White Plains, N.Y.
[21] Appl. No.: 97,117
[22] Filed: Nov. 26, 1979
[51] Int. Cl.³ .............................................. E21B 43/22
[52] U.S. Cl. .............................. 252/8.55 D; 166/246; 536/114
[58] Field of Search ................. 252/8.55 D; 536/112, 536/114, 118; 166/246, 275

[56] References Cited

U.S. PATENT DOCUMENTS

| | | | |
|---|---|---|---|
| 3,208,518 | 9/1965 | Patton | 166/246 |
| 3,352,358 | 11/1967 | Williams | 252/8.55 X |
| 3,373,810 | 3/1968 | Williams | 252/8.55 X |
| 3,498,972 | 3/1970 | Nagasawa | 536/112 |
| 3,532,166 | 10/1970 | Williams | 166/275 X |
| 4,035,569 | 7/1977 | Schweiger | 252/8.5 X |
| 4,141,842 | 2/1979 | Abdo | 166/246 X |

*Primary Examiner*—Herbert B. Guynn
*Attorney, Agent, or Firm*—Carl G. Ries; Robert A. Kulason; Jack H. Park

[57] ABSTRACT

Disclosed is a novel sulfated biopolymer, a method for synthesizing the sulfated biopolymer and an oil recovery method employing an aqueous fluid containing the material. The sulfated biopolymer is made by reacting polysaccharides with sulfuric acid in the presence of an aliphatic alcohol at a temperature of from 35° to 75° F., in order to avoid degradation of the polymer by the sulfuric acid. The polymer produces a viscous solution which is less prone to increasing viscosities as shear rate is decreased, which makes it especially suitable for use as a viscosifying polymer in a polymer flooding enhanced oil recovery process.

5 Claims, 1 Drawing Figure

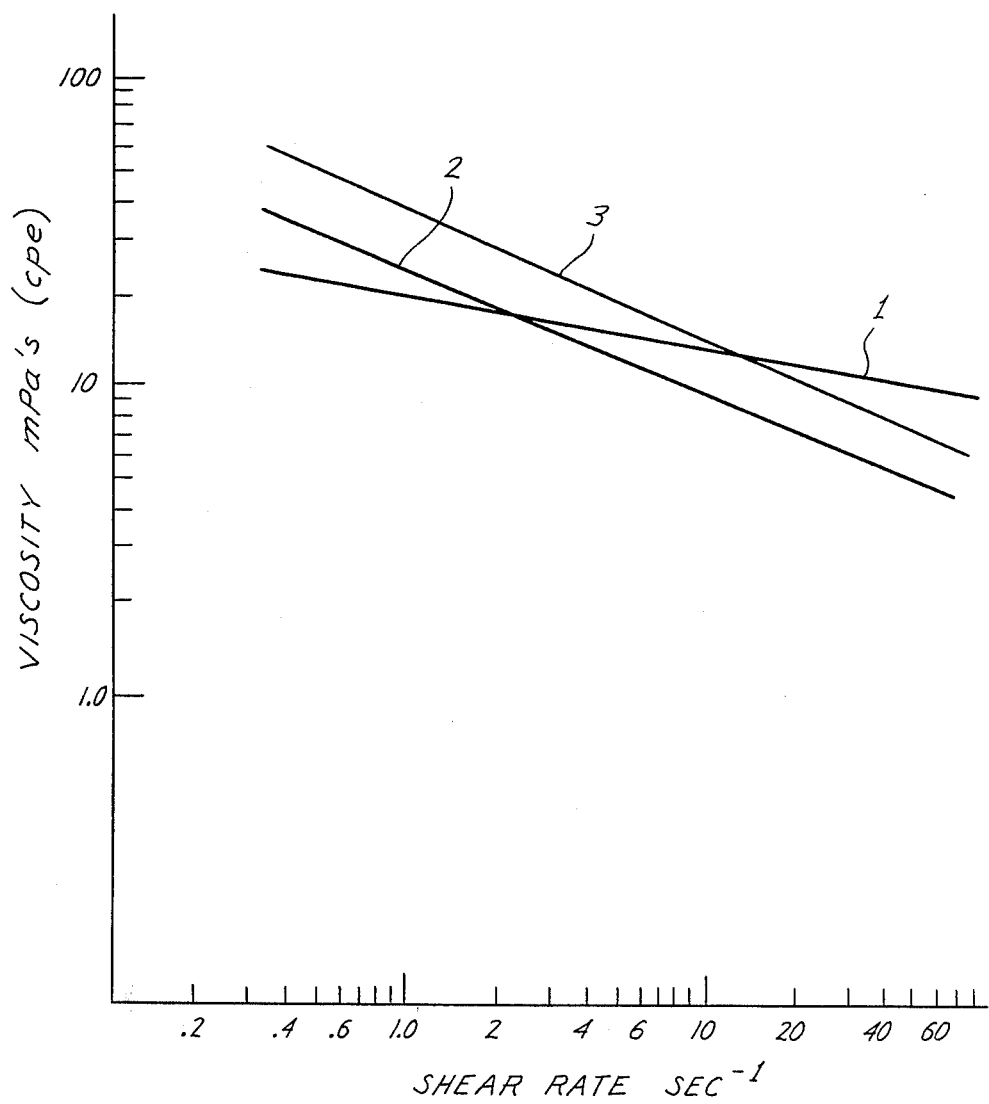

SULFATED BIOPOLYMERS FOR USE IN RECOVERING PETROLEUM FROM A SUBTERRANEAN FORMATION

FIELD OF THE INVENTION

The present invention relates to a novel chemical, specifically a sulfated biopolymer, and to a method for forming the sulfated biopolymer from conventional biopolymers, and to a novel enhanced oil recovery method using the biopolymer in an aqueous fluid.

BACKGROUND OF THE INVENTION

Polysaccharide biopolymers are widely known and used water thickening agents, employed in a variety of commercial processes. One especially well-known process involves using these biopolymers as a thickening agent in a drive fluid employed in an enhanced oil recovery process.

It is well known that primary recovery of petroleum from subterranean deposits thereof can only recover from a small percent up to about 35% of the oil originally present in the formation. Waterflooding improves the total amount of oil recovered, but still leaves large amounts of petroleum in the formation. It is well known that waterflooding is not successful for recovering larger amounts of petroleum for a variety of reasons, one of which involves the poor displacement efficiency when waterflooding is applied to a subterranean oil formation. Since the viscosity of water is substantially less than the viscosity of the oil present in the formation, injection of water into a well and production of fluids from a spaced-apart well, while sweeping a sufficient portion of the reservoir to accomplish displacement of some petroleum from that reservoir, still bypasses large amounts of oil because of the tendency for water to move in a more or less direct path between the wells. It is also known that addition of viscosifying amounts of hydrophilic polymers to the injection water, resulting in a more favorable mobility ratio, accomplishes an increase in the amount of the reservoir swept by the injected fluid, and hence an increase in the amount of oil displaced by the injected fluid. Materials which have been used for this purpose in commercial operations and described in prior art publications include polyacrylamides, partially hydrolyzed polyacrylamides, copolymers of acrylic acid and acrylamide, and polysaccharide biopolymers. Enhanced oil recovery processes using such viscous aqueous fluids, either alone or subsequent to injection of surfactant fluids, are well known in the art.

Biopolymers are favored for viscous flooding under certain conditions, as it is known that they are capable of producing relatively high fluid viscosities at low concentrations, they are resistant to shear degradation, and they maintain their viscosity in the presence of high salinities such as are frequently encountered in subterranean oil formations. It is also known that, with respect to the use of viscous fluids in combination with surfactant flooding, the biopolymers sometimes are more compatible with surfactant solutions than are some of the other hydrophilic polymers employed for this purpose.

When any fluid is injected into an injection well and fluids are recovered from a spaced-apart production well, it is known that the fluids follow a series of paths sometimes referred to as stream tubes, including the shortest path which is an essentially straight line between the injector and the producer, and a set of curved paths whose lengths increase as the deviation of these paths from the straight line increases. The rate of flow of fluids in the more remote paths decreases substantially as the distance from the straight line path increases, and it is known that in a typical situation encountered in oil recovery activities, the fluid flow rates can be 4 or 5 times lower in the outermost flow paths that in the central flow path. The lower the flow rate of fluid, the lower its shear rate. Many of the low concentration fluids containing hydrophilic polymers exhibit shear thinning i.e. the viscosity decreases as the shear rate increases. This should not be confused with shear degradation, which is a permanent alteration of the molecular structure of the polymer when the fluid is subjected to very high shear rates. Shear thinning simply means that the fluid traveling the longer flow paths, and hence moving at a lower velocity, will also exhibit a higher viscosity than the fluid in the more central, higher flow rate flow paths. This variation in the fluid viscosity between the central flowpath and more remote flowpaths, has a substantial detrimental effect on sweep efficiency.

In addition to the above-described phenomena, many petroleum formations are comprised of a plurality of layers with widely differing permeabilities, thus even the central flowpaths between injector and producer represent a plurality of flowpaths when viewed in a vertical plate through the injector and producer, and higher flow rates encountered in the high permeability layers cause higher shear rates, which decreases the viscosity of the hydrophilic polymer. Thus fluids flowing even in the central flowpaths between injector and producer, which are in lower permeability layers of a heterogeneous formation, exhibit higher viscosity than do the fluids in the high permeability, higher velocity layers.

The vertical and horizontal conformance of viscous fluids flowing through permeable formations in the above-described situations, will both be improved if the viscosity loss with increased shear rate of a fluid containing a hydrophilic polymer, is reduced.

In view of the foregoing discussion, it can be appreciated that there is a substantial need for an improved polymer which is less prone to shear thinning than the presently available commercial polymers.

SUMMARY OF THE INVENTION

Disclosed is a novel chemical, which is a sulfated polysaccharide biopolymer. Also disclosed is a method of synthesizing the sulfated polysaccharide biopolymer by reacting polysaccharide biopolymer with a sulfating reagent such as sulfuric acid in the presence of an aliphatic alcohol, such as 1-propanol, etc., at a temperature of the range of from 35° to 75° F. The sulfated biopolymer, when dissolved in water, produces an aqueous fluid which exhibits substantially less shear thinning or viscosity shear rate dependence than the original biopolymer, which is a particularly advantageous property for an aqueous fluid employed in enhanced oil recovery operations.

BRIEF DESCRIPTION OF THE DRAWINGS

FIG. 1 illustrates graphically the variation of viscosity with shear rate of 2 aqueous fluids containing conventional polysaccharide biopolymers and a fluid containing the novel sulfated polysaccharide biopolymer of this invention, illustrating the significant improvement in the shear thinning characteristic of an aqueous fluid containing the sulfated polysaccharide biopolymer.

DESCRIPTION OF THE PREFERRED EMBODIMENTS

The term biopolymers refers to, high molecular weight polymeric molecules such as proteins, nucleic acids and polysaccharides. The same term may also be used to describe synthetic biopolymers prepared from natural biopolymers. Of these three main classes of biopolymers, the present invention is concerned only with polysaccharides, and more particularly with the gums within the larger group of polysaccharide biopolymers. A typical gum is xanthan gum, which is a suitable polysaccharide biopolymer for use in preparing the sulfated biopolymer of my invention.

There are a large number of hydroxyl groups present in the Xanthan gum molecule, and other reactive functional groups, suitable for chemical reaction. The hydroxyl groups in particular enter into the sulfation reaction employed in producing the novel chemical of my invention. Sulfation of the ROH, which designates a hydroxyl group attached to one of the ring structures present in the gum, may be shown in simple form by the formula below:

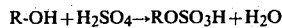

$$R\text{-}OH + H_2SO_4 \rightarrow ROSO_3H + H_2O$$

the compound may of course be neutralized with suitable reagents such as sodium hydroxide to form the sodium salt, $ROSO_3Na$. This is a simplified explanation of the sulfation reaction required to produce the biopolymer according to the process of my invention.

Polysaccharides show sensitivity to degradation on contact with mineral acids. Therefore, the reaction must be moderated to insure that the reaction conditions minimize degradation of the biopolymer while allowing the sulfation reaction to proceed unhendered. Degradation of the biopolymer is avoided by carrying out the sulfation reaction in the presence of an aliphatic alcohol, specifically a $C_3$ or greater and preferably $C_3$ to about $C_8$ aliphatic alcohol such as 1-propanol. The temperature should be maintained in the range from about 32° to about 75° F. and preferably from about 32° to 50° F. The sulfation reaction then involves a sulfate interchange between the acid sulfate and the polysaccharide as follows:

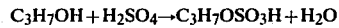
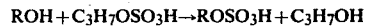

$$C_3H_7OH + H_2SO_4 \rightarrow C_3H_7OSO_3H + H_2O$$

$$ROH + C_3H_7OSO_3H \rightarrow ROSO_3H + C_3H_7OH$$

The product is then neutralized with a suitable alkalinity agent such as sodium hydroxide to form the sodium sulfate salt. Very little degradation occurs when the sulfated polymer is prepared in this method. The concentration of alcohol in the reaction mixture should be in the range of from about 5 to about 60 and preferably 40 to 50 percent by volume based on the total volume of the reaction mixture. The concentration of sulfuric acid or other sulfating reagent in the reaction mixture should be from 1 to 20 and preferably 5 to 10 percent by weight.

A sample sulfated biopolymer was made according to the process described employing Kelzan ®, the sulfation being accomplished by reacting 2 grams of Kelzan ® with 9 grams of sulfuric acid in the presence of 45 milliliters of 1-propanol and water at a temperature of about 70° F. The reaction product was filtered, dried and an aqueous fluid containing about 500 parts per million of the sulfated biopolymer was formulated. The viscosity was measured over the shear rate range from about 0.3 to about 70 reciprocal seconds. It can be seen from the attached figure that while the viscosity decreased with increased shear rate, the rate of decrease was significantly less than was measured under similar conditions for the unsulfated Kelzan ®, shown as curves 2 and 3 representing 500 part per million Kelzan ® (curve 2) and 750 part per million Kelzan ® (curve 3). This means that at very low shear rates, less than about 2 reciprocal seconds, the sulfated Kelzan ® viscosity is less than the unsulfated Kelzan. At higher shear rates, i.e. in the neighborhood of 10 reciprocal seconds, the shear rate of the sulfated Kelzan ® remains substantially higher than the shear rate of the unsulfated Kelzan ® .

The above data clearly indicates the surprising improvement in the shear rate dependency of the viscosity of an aqueous fluid containing about 500 parts per million of the sulfated Kelzan ® as compared to the unsulfated reagent.

In applying the above-described modified biopolymer in an oil recovery process, the concentration of sulfated biopolymer employed would be about the same as is normally used, i.e. in the range from about 100 to about 2000 and preferably from about 500 to about 1000 parts per million. The viscosity actually exhibited by the fluid under shear conditions in the various flow channels would be much more uniform and so both the vertical and horizontal conformance of the process is improved significantly as compared to an otherwise identical enhanced oil recovery process employing conventional (unsulfated) biopolymer such as Kelzan ®.

While my invention has been described in terms of a number of illustrative embodiments, it is clearly not so limited since many variations thereof will be apparent to persons skilled in the art of chemical synthesis and enhanced oil recovery without departing from the true spirit and scope of my invention. It is my desire and intention that my invention be limited and restricted only by those limitations and restrictions appearing in the claims appended immediately hereinafter below.

I claim:

1. A method for recovering petroleum from a subterranean, petroleum-containing formation penetrated by at least one injection well and by at least one production well, comprising injecting an aqueous fluid containing a viscosifying amount of a sulfated Xanthan gum into the formation to displace petroleum through the formation to the production well from which it is recovered to the surface of the earth.

2. A method as recited in claim 1 wherein the sulfated Xanthan gum is made by reacting a Xanthan gum with sulfuric acid sulfating reagent in an aqueous solution also containing from 5 to 60 percent by volume of an aliphatic alcohol having at least 3 carbon atoms at a temperature of from 32° to 75° F.

3. A method as recited in claim 2 wherein the temperature is from 32° to 50° F.

4. A method as recited in claim 2 wherein the concentration of alcohol is from 40 to 50 percent by volume.

5. A method as recited in claim 2 wherein the alcohol is a $C_3$ to $C_8$ aliphatic alcohol.

* * * * *